July 31, 1928. Re. 17,056
E. L. RIDLER
FLOOR AND CEILING PLATE
Original Filed March 14, 1922
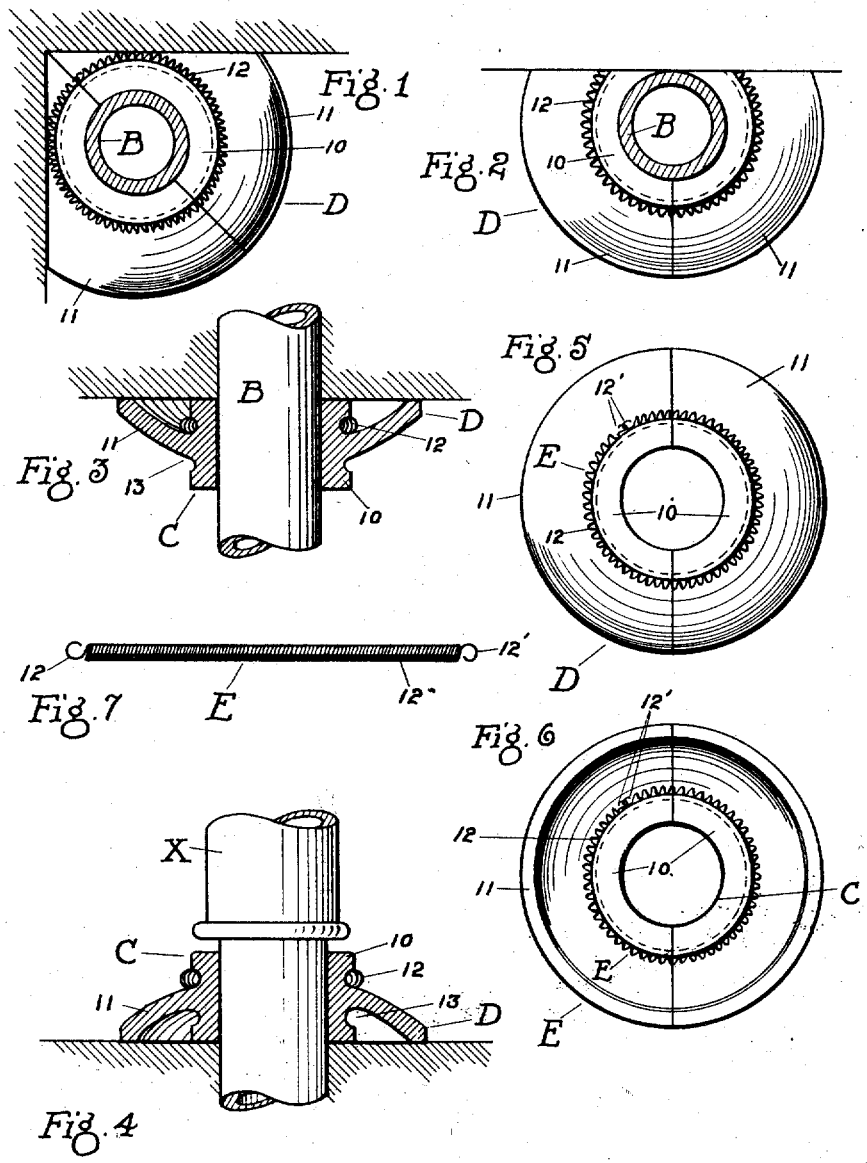
Inventor
Edward L. Ridler
By Howard Pinck
Attorney Reissued July 31, 1928. Re. 17,056

UNITED STATES PATENT OFFICE.

EDWARD L. RIDLER, OF ST. PAUL, MINNESOTA.

FLOOR AND CEILING PLATE.

Original No. 1,533,141, dated April 14, 1925, Serial No. 543,809, filed March 14, 1922. Application for reissue filed December 30, 1926. Serial No. 158,122.

My invention relates to floor and ceiling plates wherein it is designed to provide a plate of a simple nature which can be used to cover the openings in the floor usually made by the builders when the pipes are run through floors, which are left so that the pipes can be moved slightly in connecting radiators and the like in a building. My floor and ceiling plate can be used in connection with pipes, bolts and the like, to hide the cut-out in the floor or ceiling through which the pipes or the like pass.

A feature of primary importance in my invention is to provide a plate of the type mentioned, which can be readily applied to pipes in close quarters, as in corners and close to walls and which shall be ornamental, as well as simple, in construction and efficient in use.

In carrying out my invention I provide a plate having segments which are adapted to be held together by spring means so that the segments will encircle the major portion of a pipe or the like, but which segments can be cut away tangential to the core opening in the segments without preventing the attachment of the segments about the pipe to close the openings in the floor or ceiling which are usually made in a building when the pipes are inserted or installed in the same. In fact my floor and ceiling plate can be cut away even beyond the tangential plane or line with the core opening of the same as it is obvious that the plate can be cut away almost to the center just leaving sufficient material beyond the center of the plate to permit the spring means to hold the same about the pipe so that it will not come loose from the same or be easily disengaged.

It is a feature of my invention to provide a floor and ceiling plate made of segments which are adapted to be held together by spring means in a manner so that portions of the plate can be cut away and yet so that the plate will be held about the pipe or bolt to provide a finishing plate at the floor or ceiling with suitable spring means for holding the parts of the plate together.

These features, together with other objects and novel construction will be more fully and clearly set forth in the specification and claims.

In the drawings forming part of this specification:

Figure 1 is a plan view showing how the plate may be applied to a pipe in a corner.

Figure 2 is a similar view showing how the plate may be applied to a pipe which is close to a wall.

Figure 3 is a vertical section through the plate showing the flexible retaining member concealed between the flange and ceiling or floor.

Figure 4 is a vertical section through the plate showing how the flexible retaining member may be used on the outside of the segment of the plate.

Figure 5 is a plan view of my plate used in one form where the plate is complete in circular construction, none of which is cut away.

Figure 6 is a bottom view of the plate or from the inside where the spring holding member is used as in Figure 3.

Figure 7 shows one form of spring for holding the sections of the plate together.

In the drawings, B designates a pipe around which may be placed my floor or ceiling plate D which is made up of sections or parts 11. The plate comprises a collar or sleeve C having a petticoat or dished flange which projects from the sleeve C.

The sleeve C extends through the flange on the inner side thereof so that an outer portion 10 is provided, while an inner similar portion is also provided as illustrated in Figures 3 and 4 and also in 5 and 6.

The segments 11 of the plate are yieldingly and grippingly held in engagement with the pipe B by means of a spring member 12 which is provided in one form with hook ends 12′. When the plate is used in its entirety without being cut away, this spring member is adapted to coil about the sleeve portion 10 in the groove formed in the sleeve portion indicated by the groove 13 on the inside and outside of the sleeve portion 10.

My floor and ceiling plate D made of the sections or segments 11 is adapted to be cut away as illustrated in Figures 1 and 2, where close quarters are in evidence about the pipe, such as about the pipe B. When this is the case the spring member 12 is adapted to encircle the sleeve 10 just sufficiently to hold the two parts 11 together and so that the sections 11 may be cut off tangential with the opening or core in the same, as illustrated in Figure 2, where the pipe B lies directly against or in close proximity to a wall in the building. In this position the spring 12 is of sufficient rigidity to hold the two sections 11 together, gripping the pipe under spring tension and with sufficient friction to hold the plate D in position to cover the openings in the floor or ceiling.

Sometimes, there is necessity of placing the plate D about the pipe B where a fitting such as X may require the placing of the spring 12 on the outer end of the sleeve as is illustrated in Figure 4.

It is apparent that the spring for holding the plate segments 11 together may be of any suitable nature so as to firmly grip the parts of the plate 11 to hold them connected and under spring tension to the pipe or bolt about which the plate D is placed and to permit the floor or ceiling plate to be slid into position against the floor or ceiling after it has been applied about the pipe.

It is of primary importance in my invention that the floor and ceiling plate can be used in close quarters and that a suitable retaining spring means may be used to hold the segments together so that the sections 11 of the plate can be cut away sufficiently to permit the spacing of the plate in close proximity to a wall or in the corner, yet having the plate form the necessary finishing means to close any opening in the floor or ceiling about the pipe to which it is attached. The plates may be made from wood or other material which may be cut in different shapes or may be made of metal or any suitable material to provide the necessary finishing plate as may be desired about pipes and bolts or other articles of a similar nature running through floors and ceilings.

In accordance with the patent statutes I have described the principles of operation of my floor and ceiling plate and while I have illustrated a particular formation and design of the same in the drawings I desire to have it understood that this is only illustrative of a means of carrying out my invention and that the same may be applied to other uses within the scope of the following claims.

I claim:

1. A plate divided segmentally and including a sleeve and a dished flange thereon, said sleeve being grooved circumferentially and cupped at one end thereof by said flange, the segments of the plate being designed to be assembled around a pipe, and a flexible retaining member adapted to be coupled at its ends around the sleeve and within said groove for yieldingly, slidably gripping the plate segments in assembled relation upon said pipe.

2. A plate divided segmentally and including a sleeve and a dished flange, said sleeve having grooves therein, one on each side of the flange near its junction with the sleeve, one end of said sleeve being cupped by said flange, the segments of the plate being designed to be assembled around a pipe, and a flexible retaining member adapted to be coupled at its ends around the sleeve and within one of said grooves for holding the plate segments in assembled relation about the pipe.

3. A plate divided segmentally and including, a sleeve and a dished flange thereon, said sleeve being grooved circumferentially and cupped at one end thereof by said flange, the segments of the plate being designed to be assembled around a pipe, and a flexible retaining member engageable in said groove, and yieldingly, slidably gripping the plate segments in assembled relation about said pipe.

4. A plate divided segmentally, including, a sleeve and a dished flange, said sleeve having grooves therein, one on each side of the flange near its junction with the sleeve, one end of said sleeve being cupped by said flange, the segments of the plate being designed to be assembled around a pipe, and a flexible retaining member adapted to hold the plate segments in assembled relation about the pipe.

EDWARD L. RIDLER.